Patented Aug. 24, 1937

2,090,630

UNITED STATES PATENT OFFICE 2,090,630

CASEIN SOLUTION

Carl Iddings, Staten Island, N. Y., assignor to The Muralo Company, Inc., a corporation of New York No Drawing. Application December 8, 1933, Serial No. 701,570

20 Claims. (Cl. 134—12)

The present invention relates to a process of producing and/or treating a stable casein solution and the product thereof. This casein solution is characterized particularly by its stability over long periods of time, this being evidenced by its property of retaining its initial viscosity for long periods of time and by absence of putrefaction.

One object of my present invention is the production of a casein solution useful in various industrial processes and for various purposes. It is especially suitable for the manufacture of water paste paints, water-oil emulsions, glues and sizes, as well as for the preparation of numerous coating compositions adapted to be applied to walls, floors, leather, paper, etc., and it may also serve as a basis for printing inks.

Another object of my invention is to prepare a casein solution of relatively thin body and yet containing appreciable quantities of dissolved or dispersed casein, thereby allowing the production of concentrated casein solutions which nevertheless flow easily and thus, may be applied by brushing, spraying or in any other convenient manner.

A third object of my invention is the production of an easily miscible and thinnable casein solution which, when used for the preparation of water paste paints, imparts to the same high miscibility with respect to water.

A fourth object of my present invention is the production of a casein solution which, when diluted and brushed on various smooth surfaces, such as a lacquered or glass surface, presents upon drying a smooth and tenacious film, the same being of uniform thickness, fair transparency and good adhesion.

A fifth object of my invention is the addition of plasticizing agents to casein solutions which may simultaneously act as solvents.

My present invention relates to a modification of my processes of preparing stable casein solutions, these being subject matters of my copending applications, Ser. No. 701,573, filed December 9, 1933, Ser. No. 701,572 filed December 8, 1933 which matured into Patent No. 2,023,389, dated December 3, 1935, and Ser. No. 701,571, filed December 8, 1933 which matured into Patent No. 2,047,143, dated July 7, 1936. My present application, however, represents an improvement over these earlier processes, and the product resulting from this process offers distinct advantages over the products obtained by those aforementioned.

In accordance with my present invention, the casein is first dissolved or peptized as outlined in my copending applications, above referred to, to produce a smooth casein solution which may possess any degree of viscosity and pH value desired.

As particularly pointed out in my application Serial No. 701,573, such solutions may be prepared with a number of reagents including sodium or potassium fluorides, piperazine, acetamid, ammonium thiocyanate or sodium silicates. The casein solution thus produced is preferably warmed to such a temperature that the same becomes initially thinned without dilution and subsequently various thinning solvents are added and thoroughly stirred into the casein solution. I have found by experimentation that a mixing temperature of about 150 to 160° F. is normally sufficient and that the casein solution, thus warmed, takes up and blends with the thinning solvents much more rapidly than would such a solution treated at normal room temperatures. The mixture is subsequently cooled and is ready for use. I have found that the finished casein solution after such cooling, is much less viscous than would be the result had it been thinned with an equivalent amount of water and much less viscous than before addition of the solvent. The casein solution thinned with my preferred agents will flow easily, remain smooth in appearance, retain its useful adhesive properties and remain stable for long periods of time, regardless of whether the solution has been made slightly basic or slightly acidic.

I have found that the following compounds, for example, added in suitable amounts, impart to casein solutions the valuable characteristics, set forth above:

Acetone
Butanol
Diethylene glycol mono-ethyl ether
Diethylene glycol mono-butyl ether
Dioxan
Ethyl acetate
Ethyl lactate
Ethylene glycol mono-ethyl ether
Ethylene glycol mono-butyl ether
Ethylene glycol mono-ethyl ether acetate
Iso-propanol
Cyclohexanol Some of these compounds which I propose as solvents, impart the additional effect of plasticizing, notably those having the higher boiling points. One example selected from the foregoing list which falls into this category is the diethylene glycol mono-butyl ether. It will be noted that the compounds mentioned in the foregoing list have the common property of being liquid at ordinary temperatures.

It is to be noted however, that my invention is not limited to the use of the compounds set forth above, since any water soluble or partly water soluble alcohol, ester, ether or co-related substance may be used for thinning casein solutions. The term "partly water soluble" is intended to include compounds of the type disclosed, which though only slightly soluble in water, still exert a thinning action upon the casein solutions. It is also to be noted that combinations of these compounds may be used to thin casein solutions, and thus for example, I may combine an alcohol and an ester, or any two or more of such substances for the aforementioned purpose.

As far as the amounts of these thinning agents are concerned, I have found by experimentation that the quantities of thinners may be varied within wide limits, these amounts depending upon the final characteristics of the casein solutions desired. Amounts ranging from fractions of one per cent up to ten per cent and more have been used with success. When starting from a casein solution containing about 17% of solid casein by weight, I have found that 2 to 5% of thinner, based upon the total weight of the casein solution, are sufficient to impart the desired properties of low viscosity, high miscibility and improved adhesion to the same, and that films produced from such a solution become smooth and hard.

*Example*

The following table depicts the properties of two casein solutions in which solution A was thinned with water only, and solution B was thinned in accordance with my invention, the treatment being otherwise identical.

| | Solution A | Solution B |
|---|---|---|
| | Per cent | Per cent |
| Casein | 18.41 | 18.41 |
| Water | 77.75 | 72.37 |
| Sodium fluoride | 2.10 | 2.10 |
| Ammonium fluoride | 0.87 | 0.87 |
| Silica | 0.87 | 0.87 |
| Ethylene glycol mono-butyl ether | | 2.56 |
| Pine oil | | 1.28 |
| Cyclohexanol | | 1.28 |
| Inert remainder | | .26 |
| | 100.00 | 100.00 |
| Viscosity, seconds on Gardner Laboratory Mobilometer, time to drop 10 cm. at 80° F. | | |
| With 100 gm. weight and 51 hole plate | | 148 sec. |
| With 500 gm. weight instead of 100 gm. wt | 200 sec. | |

This table clearly shows the beneficial effect of my thinning agents upon the reduction of viscosity of casein solutions in comparison with an equivalent amount of water.

I may also add to any stable casein solution, so-called plasticizing agents, for example glycols, glycerols, sulphonated oils, etc., to modify the characteristics of my final casein solutions.

While I have found that the ingredients and proportions above mentioned give the desired results, I do not wish to be limited to the use of all of these ingredients, to these ingredients and no others, nor to the exact proportions, degrees of temperature and concentrations set forth above, as the omission of some ingredients or a slight variation of the proportions, cited above, will not adversely affect the final products, although it may vary somewhat the relative characteristics of such products resulting from such variations. Modifications of my invention will manifest themselves to those skilled in the art, and I wish to include such of these coming within the scope of the appended claims.

I claim:

1. A casein solution characterized by its stability and substantially uniform viscosity over long periods of time comprising about 18.41% of casein, 72.37% of water, 2.10% of sodium fluoride, 0.87% of ammonium fluoride, 0.87% of silica, 2.56% of ethylene glycol mono-butyl ether and 1.28% of pine oil.

2. A casein solution characterized by its stability and substantially uniform viscosity over long periods of time comprising casein, water, sodium fluoride, ammonium fluoride, silica, ethylene glycol mono-butyl ether and pine oil.

3. A casein solution characterized by its stability and substantially uniform viscosity over long periods of time comprising casein, water, ammonium fluoride, silica, ethylene glycol mono-butyl ether and pine oil.

4. A casein solution characterized by its stability and substantially uniform viscosity over long periods of time comprising a liquid lower aliphatic alcohol and an X-alkylene glycol mono-alkyl ether, where X represents the prefix mono- or di-.

5. A casein solution characterized by its stability and substantially uniform viscosity over long periods of time, prepared with heat and a fluoride selected from alkali metal and ammonium fluorides and having its viscosity adjusted by a liquid lower aliphatic hydrocarbon derivative selected from the group consisting of alcohols, ethers, esters and ketones displaying a greater viscosity reducing effect upon the solution than an equal amount of water and not impairing the stability of the solution.

6. A casein solution characterized by its stability and substantially uniform viscosity over long periods of time, prepared with heat and a fluoride selected from alkali metal and ammonium fluorides and having its viscosity adjusted by a liquid lower aliphatic alcohol displaying a greater viscosity reducing effect upon the solution than an equal amount of water and not impairing the stability of the solution.

7. A casein solution characterized by its stability and substantially uniform viscosity over long periods of time, prepared with heat and a fluoride selected from alkali metal and ammonium fluorides and having its viscosity adjusted by a liquid lower aliphatic ester displaying a greater viscosity reducing effect upon the solution than an equal amount of water and not impairing the stability of the solution.

8. A casein solution characterized by its stability and substantially uniform viscosity over long periods of time, prepared with heat and a fluoride selected from alkali metal and ammonium fluorides and having its viscosity adjusted by a liquid lower aliphatic ether displaying a greater viscosity reducing effect upon the solution than an equal amount of water and not impairing the stability of the solution.

9. A casein solution characterized by its stability and substantially uniform viscosity over long periods of time, prepared with heat and a fluoride selected from alkali metal and ammonium fluorides and having its viscosity adjusted by an X-alkylene glycol mono alkyl ether where X represents the prefix mono- or di- displaying a greater viscosity reducing effect upon the solution than an equal amount of water and not impairing the stability of the solution.

10. A casein solution characterized by its stability and substantially uniform viscosity over long periods of time having a pH value less than 7.0 and having incorporated therein a thinning agent which is a liquid lower aliphatic hydrocarbon derivative selected from the group consisting of alcohols, ethers, esters and ketones with a greater viscosity reducing effect upon the solution than an equal amount of water and not impairing the stability of the solution.

11. A casein solution characterized by its stability and substantially uniform viscosity over long periods of time having a pH value less than 7.0 and having incorporated therein a thinning agent which is a liquid lower aliphatic alcohol with a greater viscosity reducing effect upon the solution than an equal amount of water and not impairing the stability of the solution.

12. A casein solution characterized by its stability and substantially uniform viscosity over long periods of time having a pH value less than 7.0 and having incorporated therein a thinning agent which is a liquid lower aliphatic ester with a greater viscosity reducing effect upon the solution than an equal amount of water and not impairing the stability of the solution.

13. A casein solution characterized by its stability and substantially uniform viscosity over long periods of time having a pH value less than 7.0 and having incorporated therein a thinning agent which is a liquid lower aliphatic ether with a greater viscosity reducing effect upon the solution than an equal amount of water and not impairing the stability of the solution.

14. A casein solution characterized by its stability and substantially uniform viscosity over long periods of time having a pH value less than 7.0 and having incorporated therein a thinning agent which is an X-alkylene glycol mono alkyl ether where X represents the prefix mono- or di- with a greater viscosity reducing effect upon the solution than an equal amount of water and not impairing the stability of the solution.

15. A casein solution characterized both in slightly acid and slightly alkaline ranges by its stability and undiminished viscosity over long periods of time and having incorporated therein a thinning agent which is a liquid lower aliphatic hydrocarbon derivative selected from the group consisting of alcohols, esters, ethers and ketones which exerts upon the solution a more pronounced thinning effect than does an equal amount of water and which does not impair the stability of the solution.

16. A casein solution characterized both in slightly acid and slightly alkaline ranges by its stability and undiminished viscosity over long periods of time and having incorporated therein a thinning agent which is a liquid lower aliphatic alcohol which exerts upon the solution a more pronounced thinning effect than does an equal amount of water and which does not impair the stability of the solution.

17. A casein solution characterized both in slightly acid and slightly alkaline ranges by its stability and undiminished viscosity over long periods of time and having incorporated therein a thinning agent which is a liquid lower aliphatic ester which exerts upon the solution a more pronounced thinning effect than does an equal amount of water and which does not impair the stability of the solution.

18. A casein solution characterized both in slightly acid and slightly alkaline ranges by its stability and undiminished viscosity over long periods of time and having incorporated therein a thinning agent which is a liquid lower aliphatic ether which exerts upon the solution a more pronounced thinning effect than does an equal amount of water and which does not impair the stability of the solution.

19. A casein solution characterized both in slightly acid and slightly alkaline ranges by its stability and undiminished viscosity over long periods of time and having incorporated therein a thinning agent which is an X-alkylene glycol mono alkyl ether where X represents the prefix mono- or di- which exerts upon the solution a more pronounced thinning effect than does an equal amount of water and which does not impair the stability of the solution.

20. A casein solution characterized by its stability and substantially uniform viscosity over long periods of time, having its viscosity adjusted by a liquid lower aliphatic hydrocarbon derivative selected from the group consisting of alcohols, ethers, esters and ketones displaying a greater viscosity reducing effect upon the solution than an equal amount of water and not impairing the stability of the solution.

CARL IDDINGS.